United States Patent
Wu et al.

(10) Patent No.: US 8,079,085 B1
(45) Date of Patent: Dec. 13, 2011

(54) REDUCING FALSE POSITIVES DURING BEHAVIOR MONITORING

(75) Inventors: Chun-Da Wu, Taipei (TW); Ming-Yan Sun, Nanjing (CN); Chien-Hua Lu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 460 days.

(21) Appl. No.: 12/254,599

(22) Filed: Oct. 20, 2008

(51) Int. Cl.
*G06F 11/00* (2006.01)
*G06F 12/14* (2006.01)
*G06F 12/16* (2006.01)
*G08B 23/00* (2006.01)
*G06F 7/04* (2006.01)
*G06F 17/30* (2006.01)
*G06F 11/30* (2006.01)
*H04N 7/16* (2011.01)

(52) U.S. Cl. ............... 726/24; 726/22; 726/23; 726/26; 713/188

(58) Field of Classification Search .................. None
See application file for complete search history.

(56) References Cited

U.S. PATENT DOCUMENTS

| | | | |
|---|---|---|---|
| 7,325,185 B1 * | 1/2008 | Szor | 714/799 |
| 2005/0071649 A1 * | 3/2005 | Shipp | 713/188 |
| 2005/0223239 A1 * | 10/2005 | Dotan | 713/188 |
| 2005/0257266 A1 * | 11/2005 | Cook et al. | 726/23 |
| 2006/0041942 A1 * | 2/2006 | Edwards | 726/26 |
| 2008/0059198 A1 * | 3/2008 | Maislos et al. | 704/273 |
| 2009/0144823 A1 * | 6/2009 | Lamastra et al. | 726/22 |
| 2009/0319998 A1 * | 12/2009 | Sobel et al. | 717/128 |
| 2010/0313268 A1 * | 12/2010 | Abdulhayoglu et al. | 726/24 |

* cited by examiner

*Primary Examiner* — Shin-Hon Chen
(74) *Attorney, Agent, or Firm* — Beyer Law Group LLP

(57) ABSTRACT

A program installed on a computer system registers and is placed on an installed program list or an uninstall software list. A check of the uninstall software list (USL) is added as a secondary verification mechanism to a behavior monitoring engine. A signature-based malware scan engine may be used. If the scan engine does not flag the file as malware, then the behavior monitoring engine monitors the activities performed by the underlying application. When the behavior monitoring engine flags an activity as potentially suspicious, the USL is checked to determine if the application running the process is on the USL. If so, then the process is treated as legitimate and there is no need to alert the user. Only if both the behavior is flagged as suspicious and the application performing the behavior is not on the USL will the user receive an alert as to the potential malware.

23 Claims, 9 Drawing Sheets

List of Installed Programs

Registry

REDUCING FALSE POSITIVES DURING BEHAVIOR MONITORING

FIELD OF THE INVENTION

The present invention relates generally to the monitoring of behavior of a computer system to detect suspicious behavior. More specifically, the present invention relates to reducing false positives during behavior monitoring.

BACKGROUND OF THE INVENTION

Malware such as viruses, spyware, adware, worms, etc., is software designed to infiltrate and/or damage computer systems without their owners' consent. Malware attacks computer systems both large and small, such as workstations, desktop computers, notebook computers, tablet computers, personal digital assistants (PDAs), smart mobile telephones (smartphones), etc. and often causes great damage. Needless to say, it is very important to protect computer systems against various forms of malware.

Many software applications have been developed to protect computer systems against various types of malware. Examples of anti-malware software products include Symantec's™ Norton AntiVirus, McAfee's® VirusScan® Plus, Bit-Defender's Total Security, etc. Typically, once such a software application has been installed on a computer system, it may scan the entire computer system, i.e., the files on the computer system, or a selected portion of the computer system from time to time to detect and remove known types of malware. This technique uses a virus scan engine and virus patterns (or "virus signatures") to scan the files looking for matches to any of the virus patterns.

Recently, it has become more commonplace for anti-malware software products to forgo complete directory scanning and use of the virus patterns and instead watch for suspicious behavior on the computer system as a clue as to which files to scan. As hard drives become increasingly large, and thus increasingly more time consuming to scan as a whole, it is expected that this trend towards monitoring system behavior will continue. Different from the traditional signature-based defense, behavior monitoring watches all activities of all processes in real time. If any activity is malicious the process is stopped immediately. This technique does not use the pattern or signature of a particular malware in order to protect against that malware.

In such systems, it is necessary to monitor system behavior, and then apply a set of rules to the monitored behavior in order to determine whether an activity is suspicious or not. If an activity is suspicious, it may be blocked and a message is sent to the user asking how to handle the activity. FIG. 1 is a prior art diagram illustrating an example of a user-received pop-up window in response to the detection of suspicious behavior. The offending process 100 is identified, and the user is permitted to quarantine the process 102, terminate the process 104, or allow 106 the process to continue execution.

One of the problems encountered with this approach is false positives. Many legitimate applications perform activities (and cause computer system events) that might be seen by a behavior monitoring engine as suspicious. These false positives unduly interrupt users with pop-up windows which can become an annoyance, or worse, the legitimate application is blocked. Furthermore, when users are presented with an annoying number of pop-up requests to verify the permissibility of an action, there is a tendency for the response by the user to become "automatic," meaning the user simply allows a process to continue execution without thinking or without reading the alert in detail. This automatic response by the user ends up actually increasing the likelihood of a malicious process being accidentally permitted by the user to continue execution. Altering the rules or thresholds in order to reduce these false positives can have the negative impact of increasing the likelihood that a malicious process would not be flagged at all.

Considering the drawbacks of previous approaches, a behavior monitoring technique that reduces false positives without increasing the likelihood of false negatives is desirable.

SUMMARY OF THE INVENTION

A program installed on a computer system registers and is placed on an installed program list or an uninstall software list. A check of the uninstall software list (USL) is added as a secondary verification mechanism to a behavior monitoring engine. A signature-based malware scan engine may be used. If the scan engine does not flag the file as malware, then the behavior monitoring engine monitors the activities performed by the underlying application. When the behavior monitoring engine flags an activity as potentially suspicious, the USL is checked to determine if the application running the process is on the USL. If so, then the process is treated as legitimate and there is no need to alert the user. Only if both the behavior is flagged as suspicious and the application performing the behavior is not on the USL will the user receive an alert as to the potential malware. The check of the USL may be used in conjunction with or without use of a scan engine.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Legitimate applications being installed on common operating systems (such as a Microsoft operating system) register themselves with the operating system and add themselves to a list of currently installed programs. Typically, a software application adds program files and folders to a hard disk of a computer system and adds related data to the registry so that the application runs properly. The operating system then keeps track of these installed applications using a list of currently installed programs.

Figure 2:
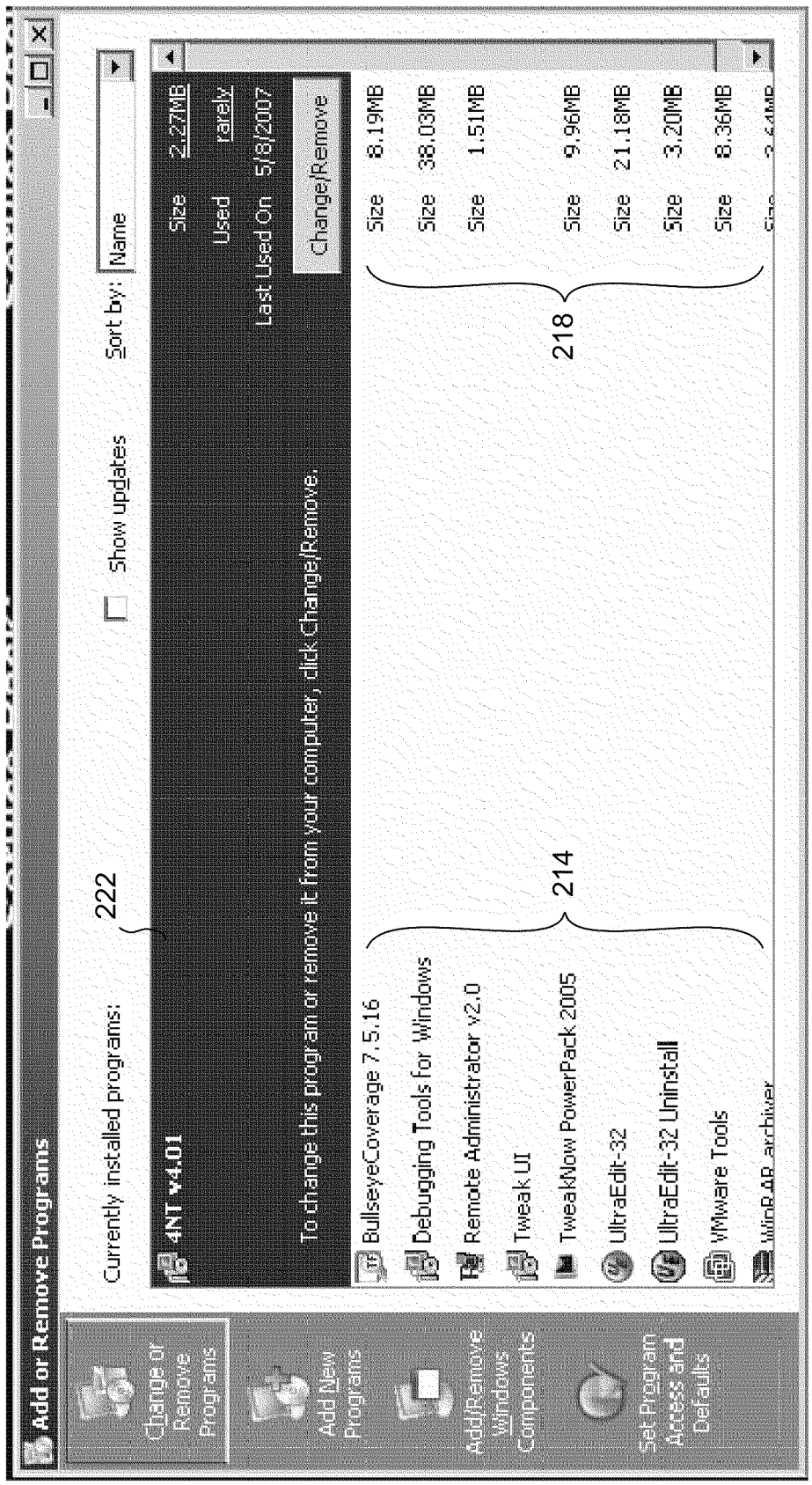
FIG. 2 is a diagram illustrating a list of installed programs.

FIG. 2 is a diagram 210 graphically illustrating a current list of installed programs for the Microsoft operating system that is reached by selecting the icon "Add or Remove Programs." This list allows users to easily view which programs are installed, view details about each program, change a program, or remove (uninstall) programs they no longer wish to have installed. Removing a program is typically termed "uninstall" since often a variety of actions must occur in order to remove the program, in addition to simply deleting the program file itself. When referring to software, an "uninstall" refers to the act of removing program files and folders from a hard disk and removing related data from the registry so that the software is no longer available for use. Shown is a list 214 including the names and icons of programs and applications that are currently installed, size details 218, and an expanded detail window 222 providing more details and the options to change or remove a particular program. The present invention uses this list (or an alternative representation) to help reduce false positives.

Figure 3A:
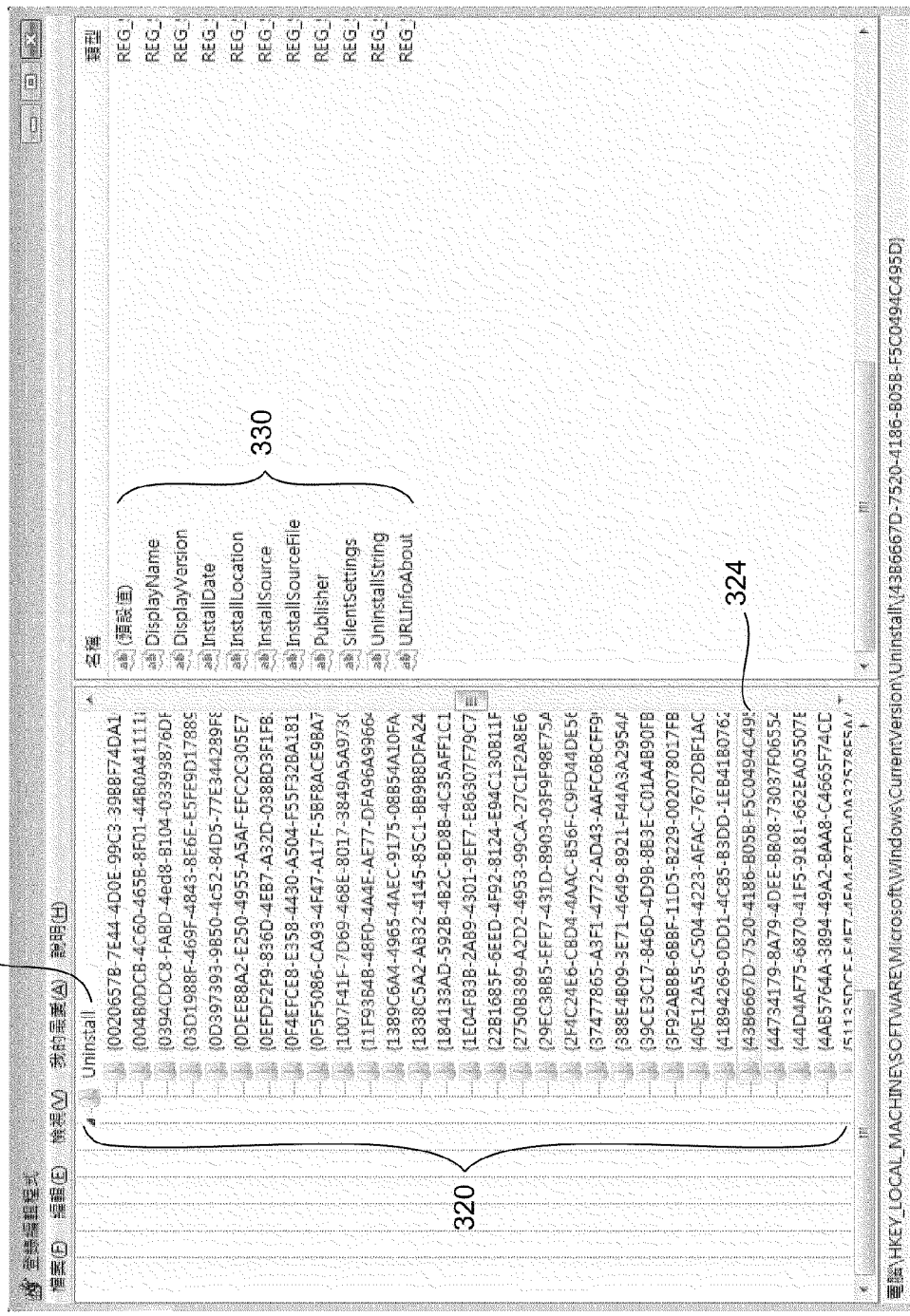
FIG. 3A is a diagram illustrating a registry for the Microsoft operating system.

FIG. 3A is a diagram illustrating a portion of a registry 310 for the Microsoft operating system. The registry includes information on software applications that have registered with the operating system. It should be noted that while the Microsoft operating system is depicted, the present invention can be modified for use with any operating system that contains a registry (or similar construct), and a representation of a list of installed programs.

As known in the art, a Microsoft registry (for example) is a database repository for information about a computer's configuration. The registry contains information that the operating system continually references during operation, such as: profiles for each user; a list of the programs installed on the computer and the types of documents each can create; property settings for folders and program icons; what hardware exists on the system; and which ports are being used. The registry is organized hierarchically as a tree and is made up of keys and their subkeys, hives, and value entries.

In this example, shown is a portion 310 that includes an uninstall registry key 314 and a list of subkeys 320 that identify the applications that have registered with the operating system. Typically, these subkeys identify an application's product code GUID. Values 330 for a particular subkey 324 are illustrated. Thus, this list of subkeys under uninstall registry key 314 identifies those legitimate applications that have registered, i.e., an "Uninstallable Software List" (USL), or the list may also be termed an "Installed Software List" or a "Registered Software List." Once registered, a user may remove software through a control panel if there is a subkey that represents the software.

Although unlikely, it is possible for malware to register itself, but if it did, a user could remove the malware through the control panel. Most malware will focus on how to infect a system rather than registering itself. Typically, malware will install itself but not register, and thus the present invention can use this information (i.e., lack of registering) to determine if it is legitimate software or not.

In an embodiment of the present invention, a check of the USL is added as a verification mechanism to a behavior monitoring engine, which is itself a secondary verification mechanism to a signature-based malware scan engine. A signature-based malware scan engine is commonly accessed via a Virus Scanning Application Programming Interface (VSAPI). Virus scan engines operate by scanning files and comparing them to signatures of known malware. If the scan engine does not flag the file as potential malware, then the behavior monitoring engine monitors the activities performed by the underlying application. When the behavior monitoring engine flags an activity or process as potentially suspicious, the USL is checked to determine if the application running the process is present on the USL. If so, then it may be assumed that the process is legitimate and there is no need to alert the user. Only if both the behavior is flagged as suspicious and the application performing the behavior is not on the USL will the user receive an alert as to the potential malware. This technique greatly reduces the number of false positives and improves the user's experience.

Flow Diagram

Figure 4:
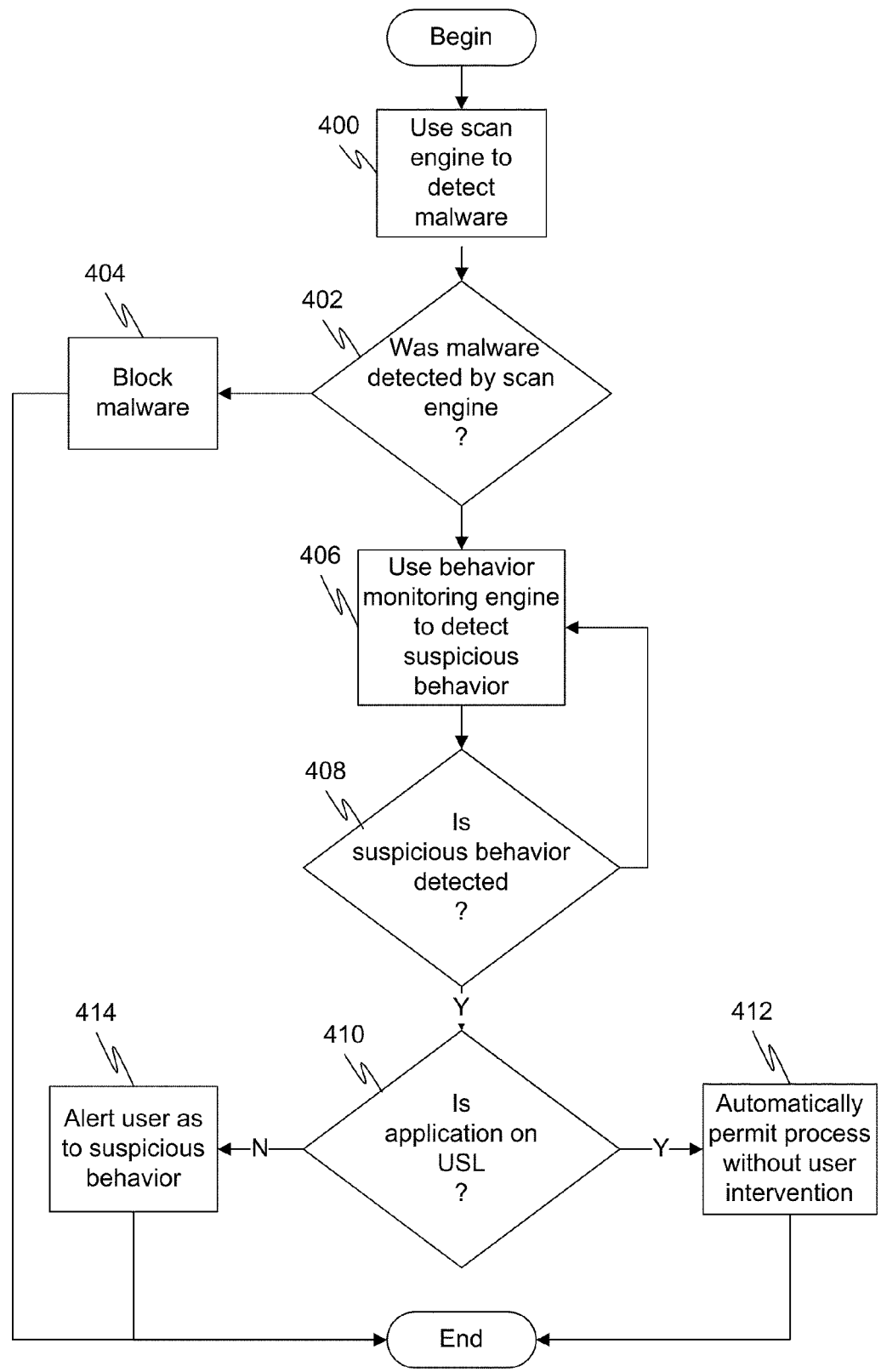
FIG. 4 is a flow diagram illustrating a method for intercepting malware in accordance with an embodiment of the present invention.

FIG. 4 is a flow diagram illustrating a method for intercepting malware in accordance with an embodiment of the present invention. At 400, a virus scan engine is used to detect malware based on virus signatures. At 402, it is determined if malware is detected by the scan engine. If so, then at 404 the malware is automatically blocked. If, on the other had, it is determined at 402 that malware is not detected by the scan engine, then at 406 a behavior monitoring engine is executed to detect suspicious behavior. Any suitable behavior monitoring engine that relies upon rules or heuristics instead of pattern matching may be used. By way of example, a behavior monitoring engine and system are described in U.S. patent application Ser. No. 12/212,378, entitled "MALWARE BEHAVIOR ANALYSIS AND POLICY CREATION", filed Sep. 17, 2008 and U.S. patent application Ser. No. 12/212,250, entitled "MULTI-BEHAVIOR POLICY MATCHING FOR MALWARE DETECTION", filed Sep. 17, 2008.

Figure 3B:
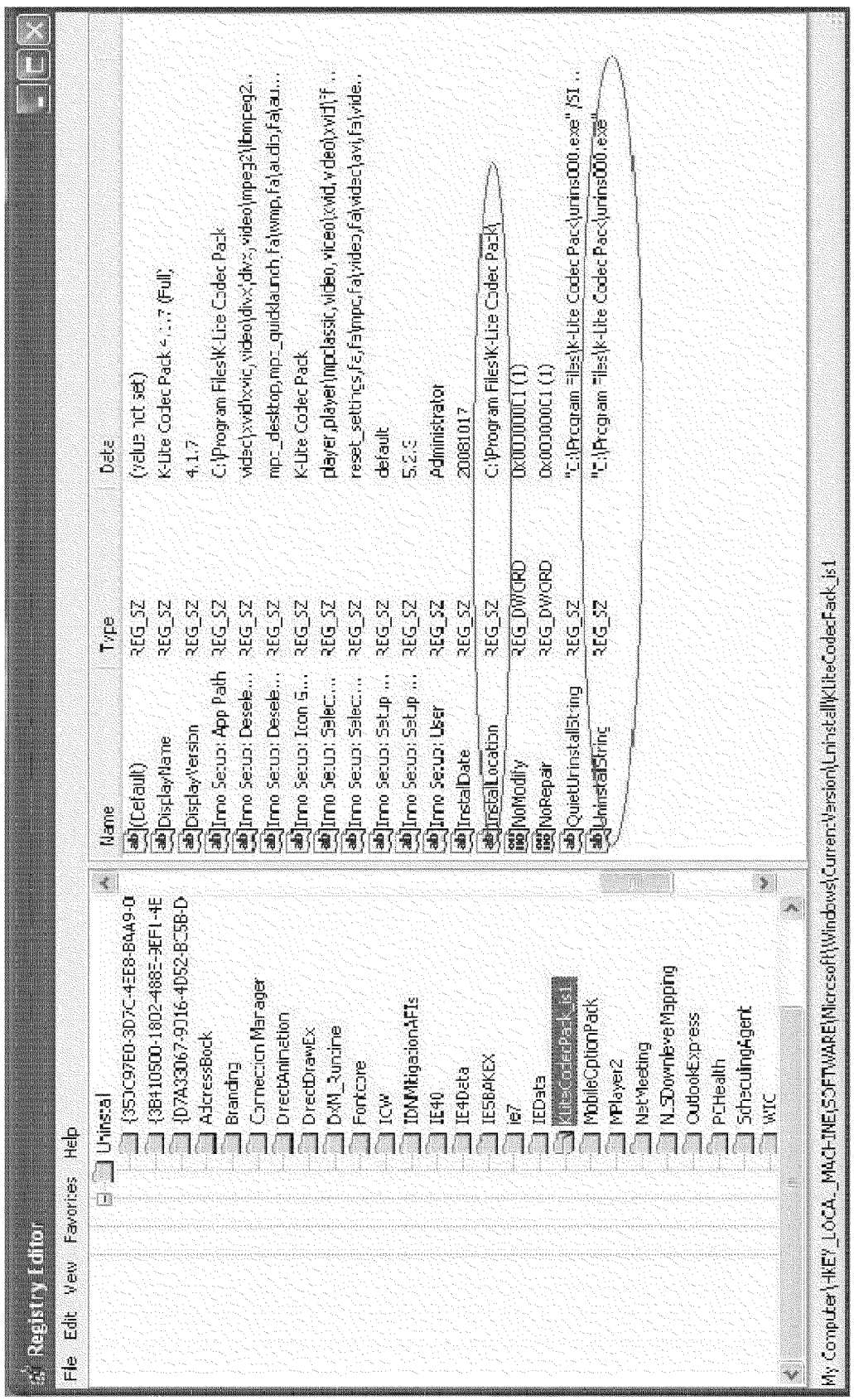
FIG. 3B is a diagram illustrating a registry editor.

If at 408, suspicious behavior is detected, then at 410, it is determined if the application causing the behavior is on the USL. It is determined if the application is listed on the USL by using the registry. For example, FIG. 3B shows an example of a registry editor 350. Included within this editor is an uninstall folder 360, a highlighted application 370 "K-Lite," and related data "install location" and "uninstall string." This information, for example, may be used to help identify the application. The two strings "install location" and "uninstall string" help to locate the image path and folder of legitimate software. Combined with other information (such as a digital signature and a file creation date), these strings help make the result more accurate.

Figure 1:
FIG. 1 is a prior art diagram illustrating an example of a user-received pop-up window in response to the detection of suspicious behavior.

If the application is on the USL, then at 412 the process (and its application) is automatically permitted to continue execution without user intervention. If, however, the behavior is not on the USL, then at 414, the user is alerted as to the suspicious behavior and asked how to proceed. The user may be alerted in a variety of manners including a technique as shown in FIG. 1. Alternatively, the behavior monitoring engine, the scan engine or other application may take steps to quarantine the application, remove the application, terminate the process, perform recovery, etc.

It should be noted that the alerting step of 414, the permitting stepped of 412, or the automatic blocking step of 404 may all be modified based on implementation preferences for the scan engine or behavior monitoring engine. In some computer systems, for example, the administrator may not even wish to allow the user to allow a suspicious activity, and thus may simply automatically block any behavior identified as suspicious whose application is not on the USL (i.e., blocking without prompting the user first) Likewise, the administrator may wish to alert the user when malware has been blocked, even though no action is required on the part of the user.

There is the possibility that some malware may register itself with the operating system and add itself to the USL. While there is a very low likelihood of this for purely malicious software such as viruses or worms, certain malware is on the borderline between malicious and innocent. Such borderline malware may include spyware or adware, which can be intentionally installed by the user yet still have negative effects on user experience and has the potential to be used maliciously. While the present invention would permit such registered malware to perform otherwise suspicious activities without user verification, the risk of this becoming a serious problem is minimal. If the software, no matter how malicious, registers itself with the operating system and adds itself to the USL, the user can easily uninstall the program should problems arise. Furthermore, the signature-based malware detection engine can easily identify such registered programs (using a virus pattern) if these programs have been deemed by an antivirus detection company to be undesirable or risky.

Use the present invention may be detected by installing on a test computer malware that performs known suspicious behavior that is known to be detectable by a behavior monitoring engine, and also installing and registering that malware so it appears on the USL. If the malware is allowed to operate without its behavior being flagged, then it is likely that the test computer is running software that implements the present invention.

System Diagram

Figure 5:
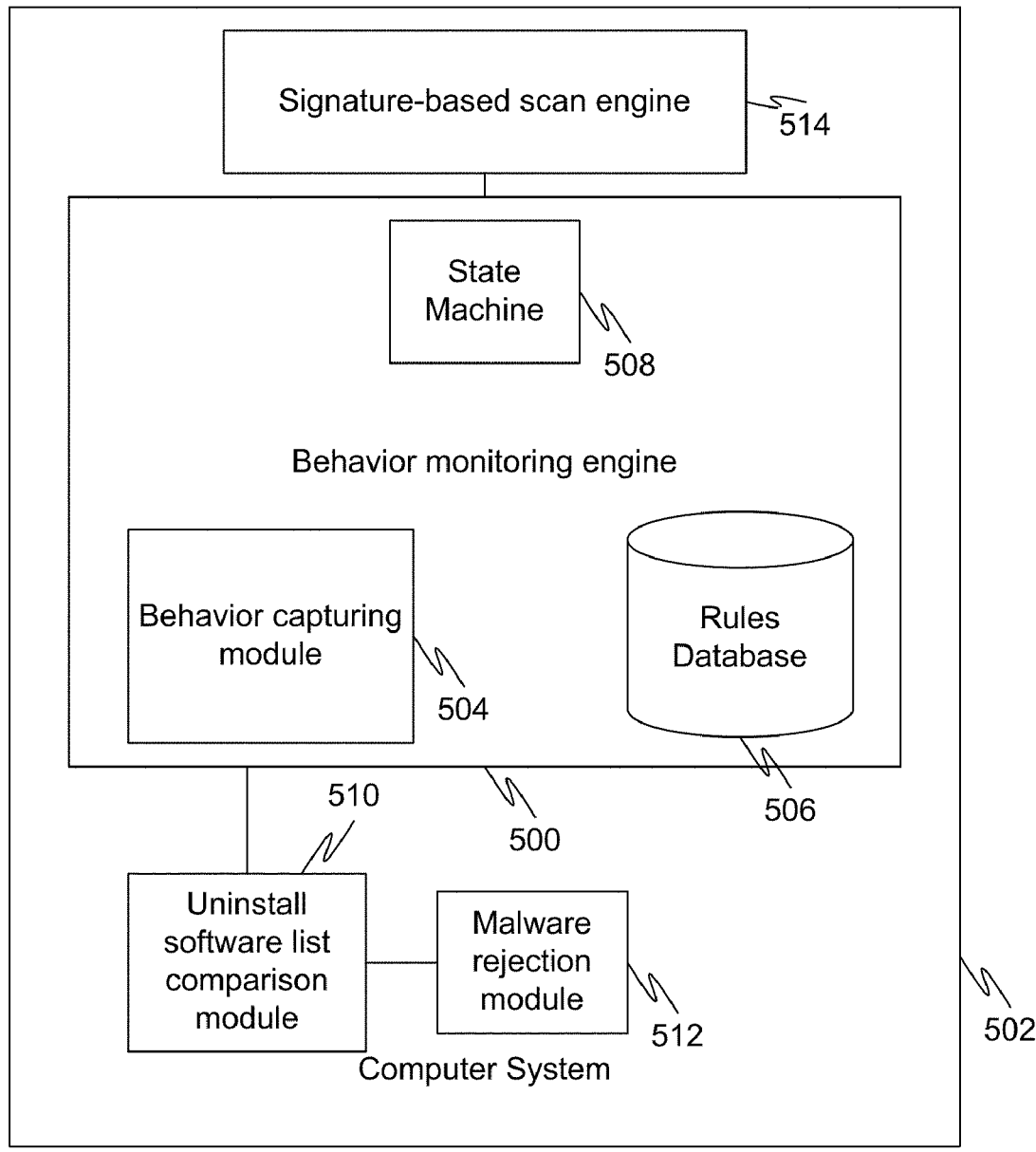
FIG. 5 is a diagram illustrating a computer system in accordance with an embodiment of the present invention.

FIG. 5 is a diagram illustrating a computer system implementing the invention. The behavior monitoring engine 500 monitors computer system 502. It should be noted that the behavior monitoring engine 500 may either be located in computer system 502, or may be located outside computer system 502. For simplicity, FIG. 5 depicts the behavior monitoring system inside computer system 502.

Behavior monitoring engine 500 includes a behavior capturing module 504 that acts to capture system behavior using driver hooks. Behavior monitoring engine also includes rule database 506 used to store the rules and policies to be applied during behavior monitoring. Behavior monitoring engine 502 also includes a state machine 508 that performs a matching algorithm using the rules and policies in the rule database.

It should be noted that each of the components in the behavior monitoring engine 502 may either be stand-alone components or may be combined with other components in a computer system. For example, rule database 506 need not be a stand-alone database. Rather, this database may be located in memory that is shared with other computing tasks, such as memory operated by computer system 502. Likewise, state machine 508 may be operated by a processor of computer system 502.

An uninstall software list (USL) comparison module 510 in communication with the behavior monitoring engine 502 is arranged to examine the USL to determine if the application flagged by the engine is located on an uninstall software list of the computer system. The USL may exist in the registry of the operating system or in another suitable location. A malware rejection module 512 then acts to alert the user to potentially block the application (or to take other action) if the behavior monitoring engine 502 indicates the behavior is suspicious and the application is not on the USL. A signature-based scan engine 514 may optionally be included in order to first scan the computer system for malware before performing behavior monitoring.

Computer System Embodiment

Figure 6A:
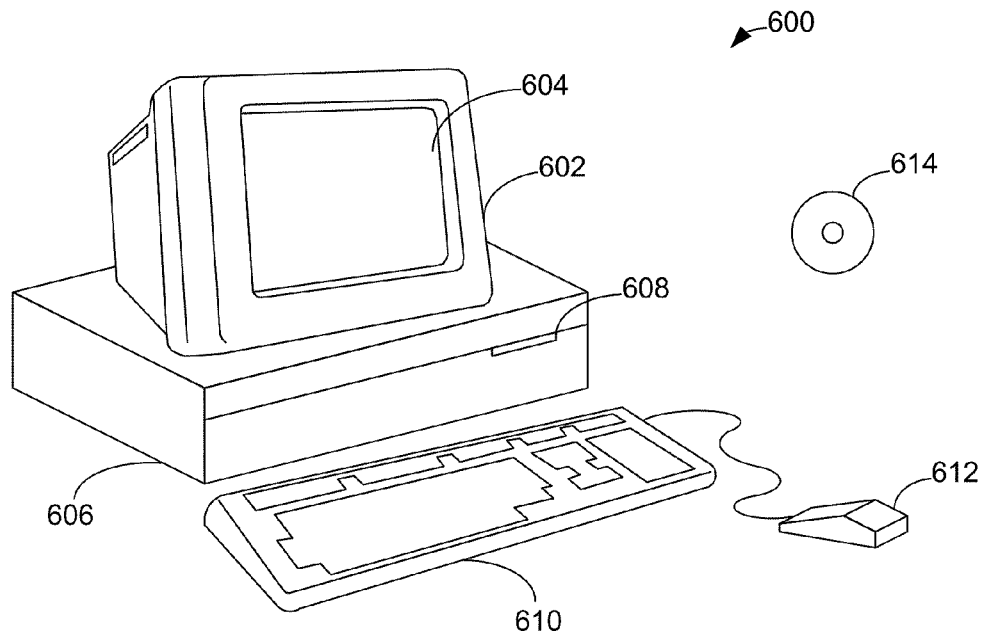
FIG. 6A shows one possible physical form of the computer system in accordance with an embodiment of the present invention.

FIG. 6A shows one possible physical form of the computer system in accordance with an embodiment of the present invention. Of course, the computer system may have many physical forms including an integrated circuit, a printed circuit board, a small handheld device (such as a mobile telephone or PDA), a personal computer or a super computer. Computer system 600 includes a monitor 602, a display 604, a housing 606, a disk drive 608, a keyboard 610 and a mouse 612. Disk 614 is a computer-readable medium used to transfer data to and from computer system 600.

Figure 6B:
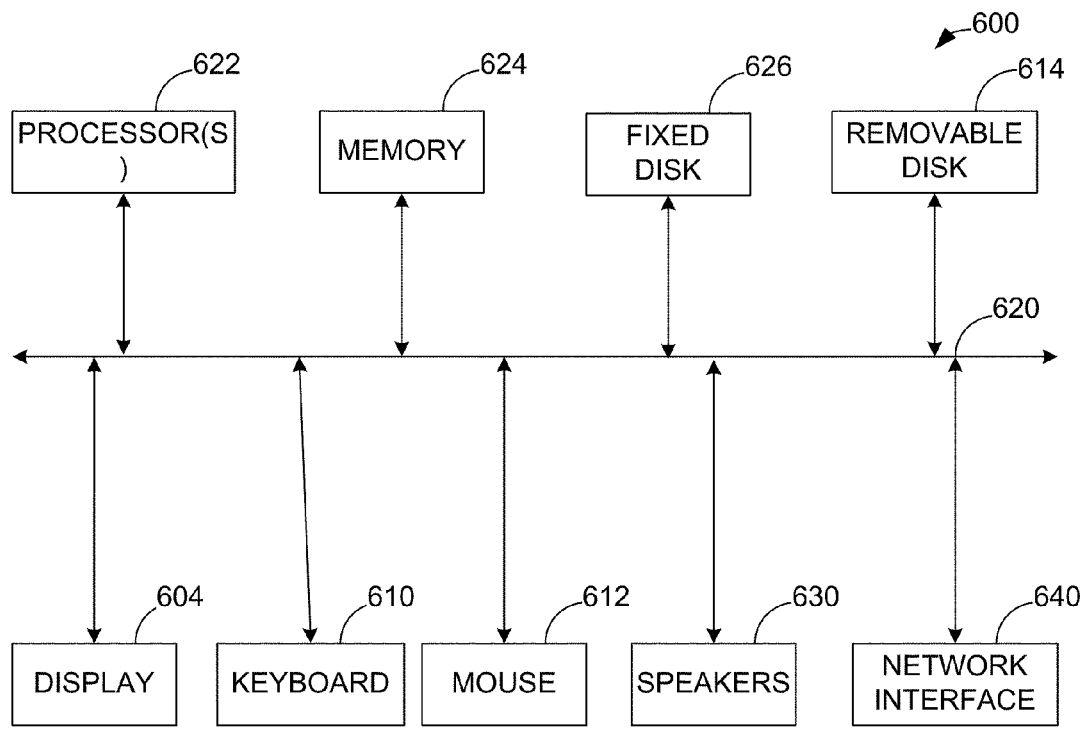
FIG. 6B is an example of a block diagram for a computer system in accordance with an embodiment of the present invention.

FIG. 6B is an example of a block diagram for computer system 600 in accordance with an embodiment of the present invention. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

Flow Diagram Alternatives

Figure 7:
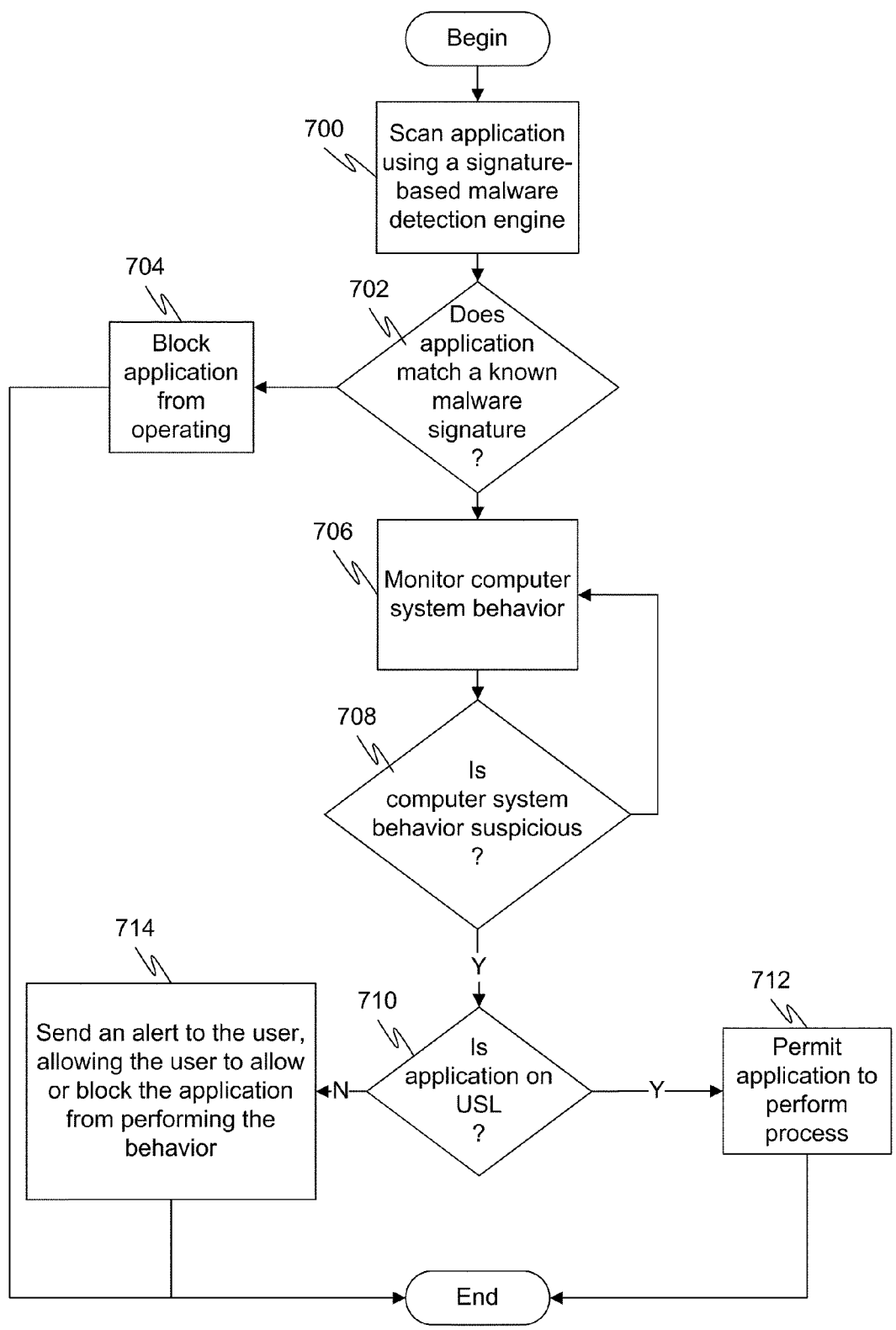
FIG. 7 is a flow diagram illustrating a method of monitoring computer system behavior in accordance with an embodiment of the present invention.

FIG. 7 is a flow diagram illustrating a method of monitoring computer system behavior in accordance with an embodiment of the present invention. At 700, the application is scanned using a signature-based malware detection engine. At 702, it is determined if the application matches a known malware signature. If so, then at 704, the application is blocked from operating. If not, then at 706, computer system behavior is monitored. This may include capturing computer system behavior using driver hooks. At 708, it is determined if the computer system behavior is suspicious by determining if a process performed by the application matches a policy, the policy containing one or more rules. If the behavior is suspicious, then at 710 it is determined if the application is located on an uninstall software list of the computer system. If so, then the application is permitted to perform the process at 712. If not, then at 714 an alert is sent to the user, the alert including an option for allowing the user to allow or block the application from performing the behavior.

Figure 8:
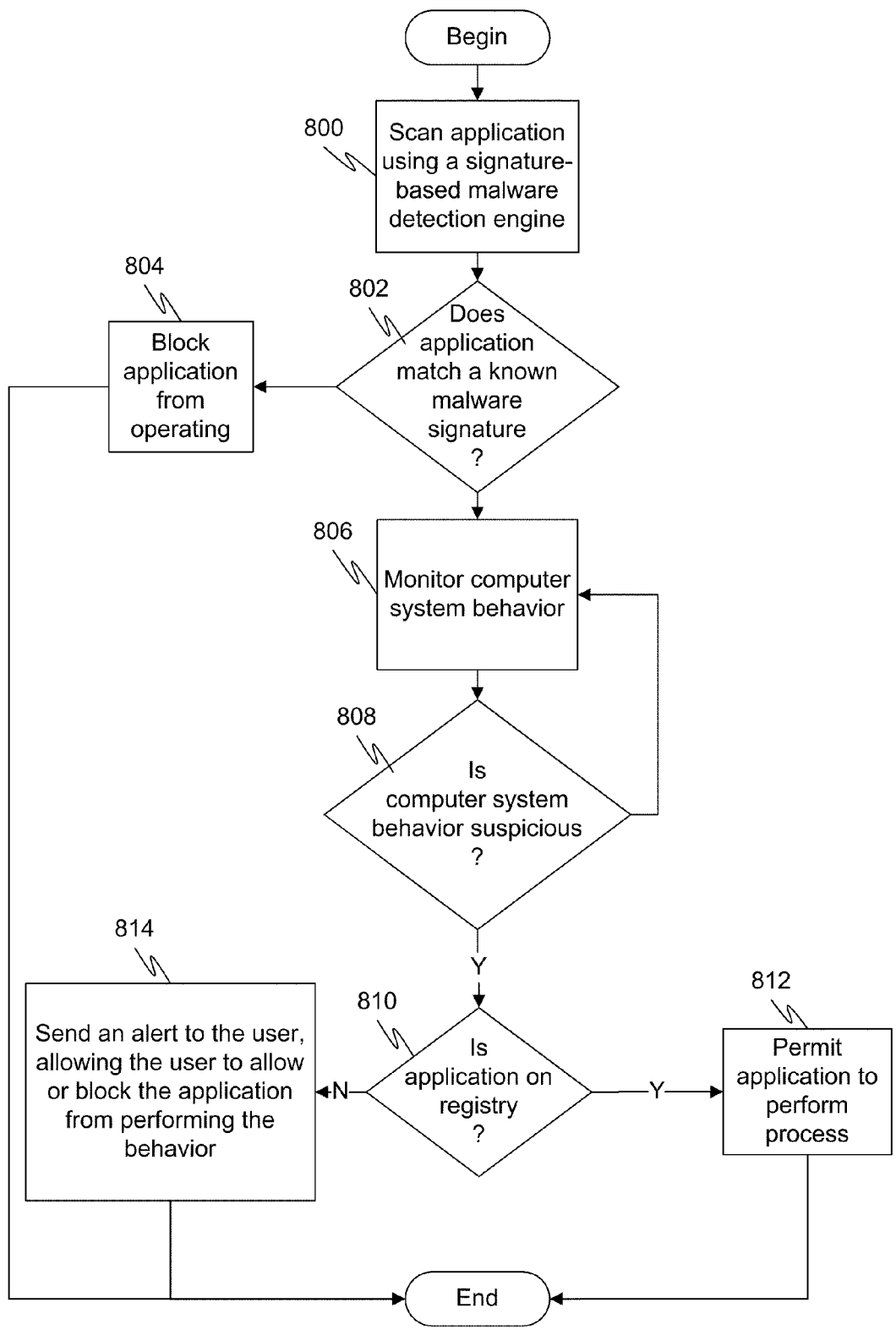
FIG. 8 is a flow diagram illustrating a method of monitoring computer system behavior in accordance with another embodiment of the present invention.

FIG. 8 is a flow diagram illustrating a method of monitoring computer system behavior in accordance with another embodiment of the present invention. At 800, the application is scanned using a signature-based malware detection engine. At 802, it is determined if the application matches a known malware signature. If so, then at 804, the application is blocked from operating. If not, then at 806, computer system behavior is monitored. This may include capturing computer system behavior using driver hooks. At 808, it is determined if the computer system behavior is suspicious by determining if a process performed by the application matches a policy, the policy containing one or more rules. If the behavior is suspicious, then at 810 it is determined if the application is located in a registry list corresponding to applications that have been installed on the computer system. If so, then the application is permitted to perform the process at 812. If not, then at 814 an alert is sent to the user, the alert including an option for allowing the user to allow or block the application from performing the behavior.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of monitoring computer system behavior, said method comprising:
    monitoring, using an anti-malware program, behavior of the computer system to detect suspicious behavior;
    when suspicious behavior is detected, performing the following:
        identifying an application responsible for the suspicious behavior;
        determining, using the anti-malware program, whether said application is present on a centrally uninstallable software list of an operating system running on said computer system, wherein the centrally uninstallable software list is also utilized by the operating system independent of the anti-malware program, wherein the presence of said application on said centrally uninstallable software list indicates that said application has been previously installed on said computer system and is available to be uninstalled through a centralized operating system process; and
        permitting said application to perform said process when it is determined that said application is present on said centrally uninstallable software list.

2. The method of claim 1 further comprising:
    scanning a computer file associated with said application using a signature-based virus detection engine;
    blocking said application from operating when said signature-based virus detection engine detects a match between said application and a known signature for malware; and
    performing said identifying, determining whether and permitting only when said signature-based virus detection engine does not detect a match between said application and said known signature for malware.

3. The method of claim 1 further comprising:
    sending an alert to a user if said application is not located on said software list.

4. The method of claim 1 wherein said step of determining includes:
    comparing events caused by said process to at least one anti-malware policy to determine if there is a match.

5. The method of claim 1 further comprising:
    taking no action to alert a user between said steps of determining.

6. The method of claim 1 wherein said software list is an installed program list.

7. The method of claim 1 wherein said software list is embodied in a registry key in a registry of said operating system.

8. The method of claim 1 wherein said first step of determining includes:
    executing a behavior monitoring engine that matches rules to events caused by said process.

9. The method of claim 1, further comprising:
    scanning a computer file associated with an application using a signature-based virus detection engine; and
    blocking the application from operating when the signature-based virus detection engine detects a match between the application and a known signature for malware.

10. The method of claim 1, wherein the identifying, determining, and permitting reduce false positives caused by the behavior monitoring.

11. A method of detecting malware in a computer system, said method comprising:
executing a virus scan engine to perform a scan of files on said computer system;
making a determination based upon said scan that no malware is present in said computer system;
when the virus scan engine determines that no malware is present, monitoring behavior of the computer system to detect suspicious behavior;
when suspicious behavior is detected, performing the following:
identifying an application responsible for the suspicious behavior;
determining, using an anti-malware program, whether said application is present on a centrally uninstallable software list of an operating system running on said computer system, wherein the centrally uninstallable software list is also utilized by the operating system independent of the anti-malware program, wherein the presence of said application on said centrally uninstallable software list indicates that said application has been previously installed on said computer system and is available to be uninstalled through a centralized operating system process; and
permitting said application to perform said process when it is determined that said application is present on said centrally uninstallable software list.

12. The method of claim 11 further comprising:
sending an alert to a user if said application is not located on said software list.

13. The method of claim 11 further comprising:
taking no action to alert a user after said step of detecting.

14. The method of claim 11 wherein said software list is an installed program list, an uninstall software list, or a list associated with a registry key in said operating system.

15. The method of claim 11 wherein said step of detecting includes:
matching rules to events caused by said process.

16. A method of detecting malware in a computer system, said method comprising:
receiving an indication of an application desiring to be installed in said computer system;
installing said application in said computer system;
placing an application identifier associated with said application on a centrally uninstallable software list using the operating system independent of an anti-malware program, wherein the centrally uninstallable software list indicates that said application has been installed in said computer system and is available to be uninstalled through a centralized operating system process;
upon detecting suspicious behavior by a process of said computer system that is associated with said application:
determining that said application identifier is present on said software list of said computer system; and
permitting said application to perform said process when it is determined that said application identifier is present on said software list.

17. The method of claim 16 further comprising:
taking no action to impede the execution of said process when it is determined that said application identifier is present on said software list.

18. The method of claim 16 wherein said software list is an installed program list, an uninstall software list, or a list associated with a registry key in said operating system.

19. The method of claim 16 wherein said step of detecting includes:
executing a behavior monitoring engine that includes a policy; and
matching rules of said policy to events caused by said process.

20. The method of claim 16 further comprising:
executing a virus scan engine to perform a scan of files on said computer system; and
making a determination based upon said scan that no malware is present in said computer system.

21. The method of claim 16 further comprising:
taking no action to alert a user of said computer system after said step of detecting.

22. An apparatus comprising:
a behavior monitoring engine comprising:
a behavior capturing module configured to capture behavior of processes on a computer system;
a rules database; and
a state machine configured to compare captured behavior of processes on the computer system to rules contained in the rules database to determine that the behavior is suspicious;
an uninstall software list comparison module configured to, upon the state machine determining that the behavior is suspicious, determine if an application associated with the processes is present on an uninstall software list for the computer system, wherein the uninstall software list is maintained and used by an operating system independent of the behavior monitoring engine; and
a malware rejection module configured to permit the application to perform the processes when it is determined that the application is present on the uninstall software list for the computer system.

23. The apparatus of claim 22, further comprising a signature-based scan engine configured to scan the computer system for malware prior to performing behavior monitoring.

* * * * *